No. 780,886. Patented January 24, 1905.

UNITED STATES PATENT OFFICE.

RUDOLF HUTZLER, OF LUDWIGSHAFEN-ON-THE-RHINE, GERMANY, ASSIGNOR TO BADISCHE ANILIN UND SODA FABRIK, OF LUDWIGSHAFEN-ON-THE-RHINE, GERMANY, A CORPORATION.

PROCESS OF PURIFYING INDIGO.

SPECIFICATION forming part of Letters Patent No. 780,886, dated January 24, 1905.

Application filed April 10, 1903. Serial No. 152,060.

*To all whom it may concern:*

Be it known that I, RUDOLF HUTZLER, a subject of the King of Bavaria, residing at Ludwigshafen-on-the-Rhine, in the Kingdom of Bavaria, Empire of Germany, have invented new and useful Improvements in Processes of Purifying Indigo, of which the following is a specification.

Indigo, both natural and synthetic, frequently contains, as is known, certain impurities. I have discovered that these impurities can be removed by treating the indigo to be purified with a phenol (which may be etherfied) in such quantity that only the aforesaid impurities are removed, while the indigo remains undissolved. As phenols there can be employed carbolic acid, cresol, naphthol, or the like, or the ethers of these compounds.

The following examples will serve to further illustrate the nature of my invention, which, however, is not confined to these examples. The parts are by weight.

Example 1: Mix together one (1) part of finely-ground indigo and three (3) parts of raw carbolic acid. Introduce the mixture into a vessel provided with a stirrer and heat it for several hours in an oil-bath, while stirring, to a temperature of from one hundred and twenty to one hundred and forty degrees centigrade, (120° to 140° C.) When cold, collect the indigo by means of a suction-pump and wash it, using first carbolic acid, then to remove the latter dilute caustic-soda lye, and finally water. Dry the powder so obtained.

Example 2: Mix together one (1) part of finely-ground indigo three (3) parts of alpha-naphthol-ethyl-ether. Heat the whole as described in the preceding example 1 to a temperature of from one hundred and fifty to one hundred and sixty degrees centigrade, (150° to 160° C.) When cold, collect the indigo by suction and wash it first with naphthol-ether and then with alcohol and dry it.

I claim—

1. The process for the purification of indigo by heating it with a phenol in such quantity that the said impurities are removed, while the indigo remains substantially undissolved.

2. The process for the purification of indigo by heating it with an etherfied phenol in such quantity that the said impurities are removed, while the indigo remains substantially undissolved.

In testimony whereof I have hereunto set my hand in the presence of two subscribing witnesses.

RUDOLF HUTZLER.

Witnesses:
ERNEST F. EHRHARDT,
H. W. NORRIS.